(12) United States Patent
Rollender

(10) Patent No.: US 7,715,821 B2
(45) Date of Patent: May 11, 2010

(54) METHOD OF UPDATING A UNIQUE CALL BACK NUMBER FOR A WIRELESS EMERGENCY CALL

(75) Inventor: Douglas H. Rollender, Bridgewater, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 11/060,596

(22) Filed: Feb. 18, 2005

(65) Prior Publication Data

US 2006/0189303 A1 Aug. 24, 2006

(51) Int. Cl.
*H04M 11/04* (2006.01)
(52) U.S. Cl. .................. 455/404.1; 455/417; 455/521; 455/414.2; 379/45; 379/46; 379/37
(58) Field of Classification Search ............. 455/414.2, 455/401, 521; 379/210.01, 404.1
See application file for complete search history.

(56) References Cited

U.S. PATENT DOCUMENTS

| 4,018,720 | A | | 4/1977 | Lengyel et al. | |
| 4,347,151 | A | | 8/1982 | Lohr et al. | |
| 5,712,900 | A | * | 1/1998 | Maupin et al. | 455/433 |
| 5,937,344 | A | * | 8/1999 | Zicker | 455/404.1 |
| 6,157,832 | A | * | 12/2000 | Lahtinen | 455/433 |
| 7,302,250 | B2 | | 11/2007 | Chin et al. | 455/410 |
| 2002/0111159 | A1 | * | 8/2002 | Faccin et al. | 455/422 |
| 2004/0141607 | A1 | | 7/2004 | Rollender | 379/210.1 |
| 2004/0203565 | A1 | | 10/2004 | Chin et al. | 455/404.1 |
| 2004/0203573 | A1 | | 10/2004 | Chin et al. | 455/404.1 |
| 2004/0203574 | A1 | | 10/2004 | Chin et al. | 455/404.1 |
| 2005/0200492 | A1 | * | 9/2005 | Woodard et al. | 340/632 |

FOREIGN PATENT DOCUMENTS

CH 505 198 3/1971

OTHER PUBLICATIONS

"NENA Technical Information Document (TID) On PSAP Call Back to All 9-1-1 Callers, Combating Wireles E911 Fraud And Mobile Emergency Service (E911M)", prepared by National Emergency Number Association (NENA), Mobile Emergency Service (E911M) Joint Working Group of the Wireless Technical Committee and the Network Technical Committee, Published by NENA, Mar. 22, 2005, pp. 1-51.

* cited by examiner

*Primary Examiner*—George Eng
*Assistant Examiner*—Muthuswamy G Manoharan
(74) *Attorney, Agent, or Firm*—Harness, Dickey & Pierce

(57) ABSTRACT

In the method of updating a unique call back number for a wireless unit having originated an emergency call, a unique call back number for the wireless unit is updated (e.g., changed or added to a list of unique call back numbers) based on a received unique call back number.

12 Claims, 5 Drawing Sheets

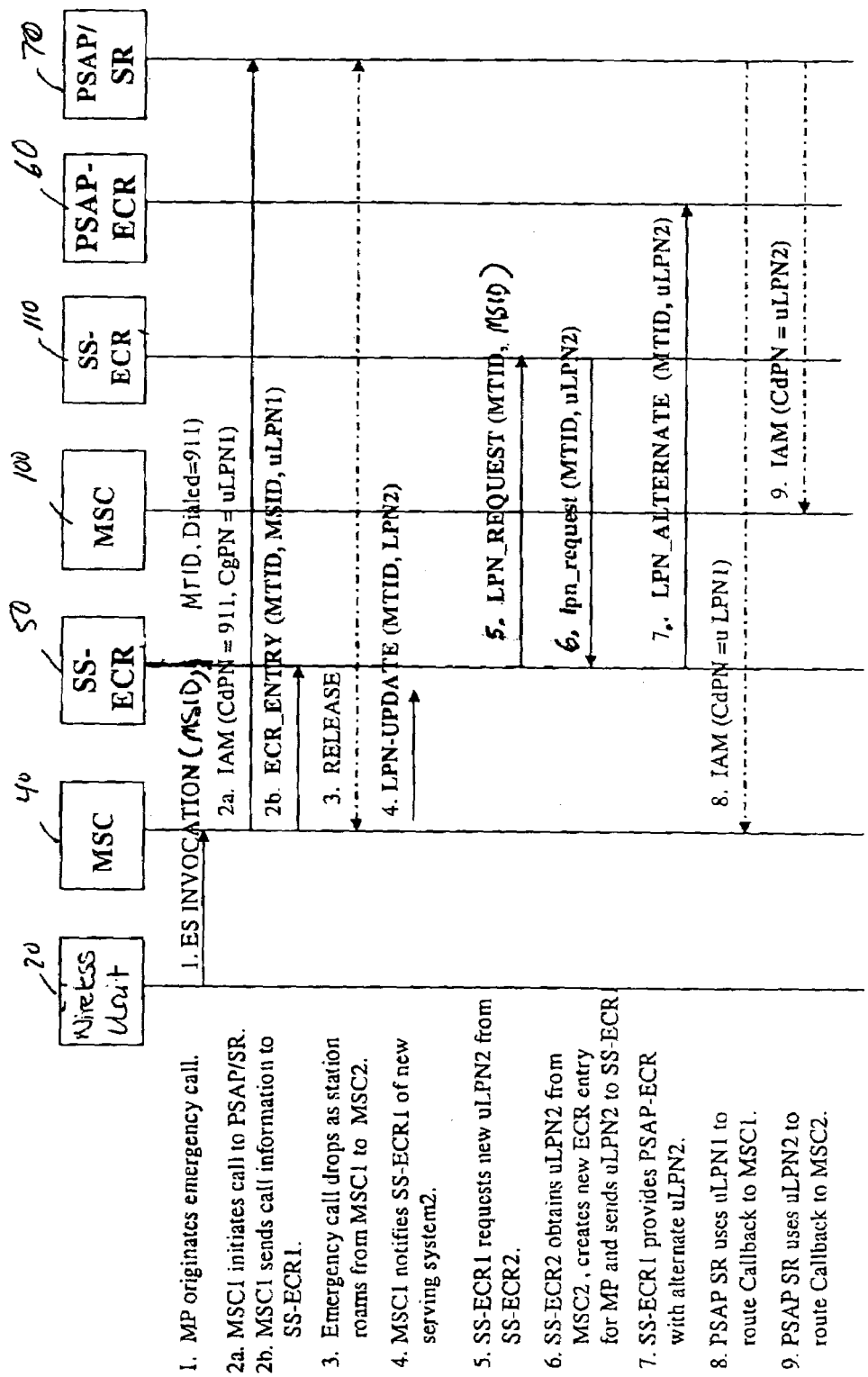

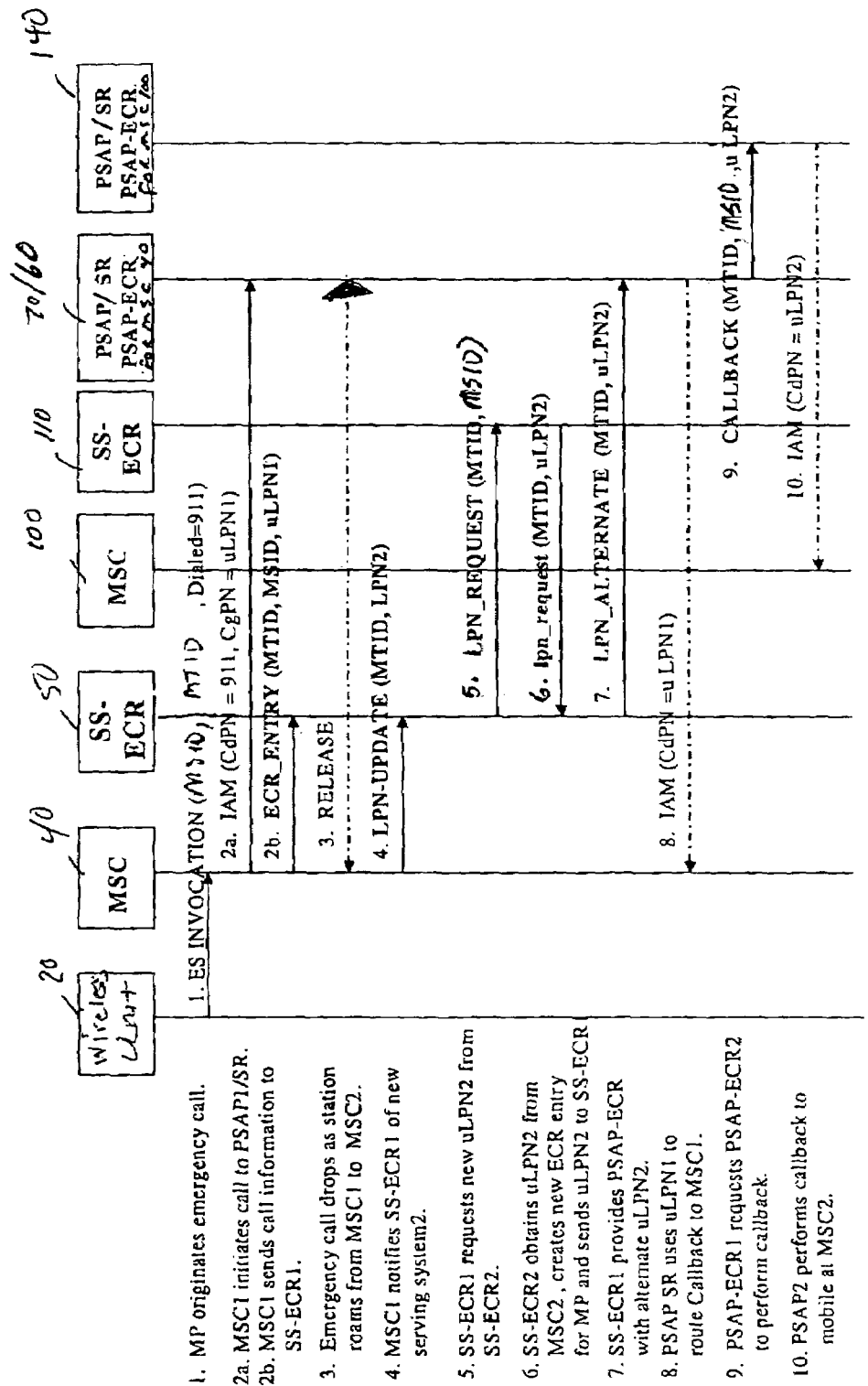

METHOD OF UPDATING A UNIQUE CALL BACK NUMBER FOR A WIRELESS EMERGENCY CALL

BACKGROUND OF THE INVENTION

1. Field of the Invention

The present invention relates to telecommunications, and more particularly, to wireless communications.

2. Description of Related Art

Emergency service calls in North America may be originated by dialing "9-1-1." Other parts of the world may use another abbreviated string of dialable digits, such as "6-1-1" in Mexico, for example. These abbreviated strings of digits are intended to simplify an emergency call for help with an easy to remember number. These emergency calls may be routed to a local Public Service Answering Point ("PSAP") call center to enable the initiation of an emergency response (e.g., police, fire department, road repair, and/or ambulance) while the caller is kept on the phone. If, however, the call is somehow disconnected or dropped before the emergency is completely reported or the responder arrives, the PSAP call center may be required to call back the originator.

Presently, a record for a "9-1-1" call originated through a wired network may include Automatic Line Identification ("ALI") or the telephone number of the access line from which the call originated. The directory number ("DN") or telephone number of a wireless subscriber may not, however, be associated with a physical line or wireless unit. Calls to a roaming wireless subscriber are routed to the wireless unit by way of the mobile station identification ("MSID"), as opposed to the mobile DN ("MDN"). Accordingly, performing an emergency call back to a wireless unit poses hurdles not encountered with landline devices, for example.

The MSID may typically be characterized as either a 10-digit mobile identification number ("MIN") or a 15-digit International Mobile Subscriber Identifier ("IMSI"). The IMSI may be programmed into a wireless unit or a Subscriber Identity Module ("SIM") card by the service provider with whom the wireless unit user has entered into a service agreement. Accordingly, the MSID may not necessarily be a dialable number.

The DN of a wireless unit is a dialable number. The DN dialed by a caller and used to route a call through the network to the wireless subscriber's home system. At the subscriber's home system, the home location register ("HLR") contains the MSID associated with the subscriber's DN. The MSID, as opposed to the DN, may then be used to route the call through the network to the serving wireless system and page the subscriber. The subscriber's DN may be provided to the serving system from the SIM card through the wireless unit or by the home system to the serving system in a separate data file called the subscriber profile.

The rollout of systems employing a separate number for DN and MSID is a relatively recent occurrence for some wireless systems. Others have used this technique since their inception. Historically, the mobile identification number of a wireless unit was the same as the DN for some systems, particularly in systems supportive of TIA/EIA-41 standards, prior to implementing wireless number portability ("WNP") or thousands block number pooling ("TBNP") based on the Local Routing Number ("LRN") method and international roaming ("IR"). However, with WNP and TBNP, the MDN became "portable" or "poolable" from one service provider to another service provider. Since a MSID may not be portable or poolable, the recipient service provider may assign a new MSID for a subscriber with a ported-in or pooled MDN.

International roaming has also forced the separation of MSID and MDN. While the MIN is a 10-digit number modeled after the North American Numbering Plan's 10-digit MDN, other nation's carriers using a different directory numbering plan may not allow their subscriber's DN to be equivalent to the internationally recognized MIN format. Another standard MSID is the IMSI. It may be used in TIA/EIA-41 and GSM systems around the world. IMSI is a 15-digit non-dialable number based on ITU-T Recommendation E.212, and therefore, may not serve as a 10-digit MDN.

Historically, when the MDN was the same as the MIN, the MIN would be delivered to a PSAP call center and would be used as a call back number. With the separation of MIN and MDN as described above, it became necessary to deliver the MDN as a separate call back number to the PSAP call center, as well as the caller's MSID. There are certain problems, however, associated with implementing this solution. One issue is that the serving system may not have the caller's MDN, only the MSID, to present to the PSAP call center with the call. Some of the reasons for this relate to the way MSID-MDN separation has been implemented according to standards. Another reason is that the network interface used to deliver the call to the PSAP call center may not have the capacity to signal both the DN and MSID or, in some cases, even a full DN.

An old serving TIA/EIA-41 system may not support WNP, TBNP or IR. This means that the older serving system may be expecting the MIN and the MDN to be the same. The older system would not even know to look for a separate MDN in the subscriber's service profile (e.g., keyed on MIN, not MDN). With this limitation, these subscribers may not be allowed to use basic services, but they must be allowed to call for emergency services. As a result, a roamer who dials "9-1-1" while on an old system will have his or her call delivered to the PSAP call center with an MSID but no MDN. Accordingly, no call back is possible.

A newer serving system that is WNP and IR capable may not be able to deliver MDN to the PSAP call center. This could happen if the calling wireless unit is not registered with any service provider (e.g., there are mobile phones used for emergency calls only). These wireless units may be referred to as non-subscriber initialized ("NSI") phones. It is also possible for a subscriber to place an emergency call before the HLR has responded to the serving system with the subscriber's service profile containing the DN. Even if the PSAP call center has been provided with a working DN for callback, the callback to the DN will not go through if the subscriber has call forwarding service for all inbound calls or if the subscriber has a limited, pre-paid service and there is no remaining balance available to pay for the inbound callback from the PSAP call center. Further, if the callback number is to a visiting international roamer, the PSAP call center may need to place an international call. Some PSAP call center may not have the ability to callback an international number. There is also the risk of network congestion or delay in completing an international call that would be detrimental to handling an emergency in a timely manner. Some PSAP call centers may not even be equipped to place any outbound calls through separate, outbound administrative lines.

The call back DN for an international roamer would require the PSAP call center to place an international call to reach a subscriber in their local Emergency Service Zone ("ESZ"). This is not a practical, timely or sufficiently reliable solution for a PSAP call center that normally does not place international calls and for applications that may require immediate call back information for emergency purposes. In addition, the entire international MDN (up to 15 digits including a country code) may not be presented to the PSAP call center for call back if the PSAP call center only supports 10 digits.

It is also possible that the calling wireless unit is not registered with any service provider. As a result, there may be no DN associated with the wireless unit or no permanent MSID encoded in the wireless unit—such wireless units are referred to as NSI mobile phones, for example. This could be because (a) the NSI phone was never intended to be registered (there are such phones to use for emergency calls only), (b) the phone is new and has not yet been initialized by a service provider, (c) the subscription has expired and the NSI phone is no longer registered with a service provider or (d) the SIM card is lost, stolen, or simply never been inserted or been removed either advertently or inadvertently.

Some wireless units also support a removable User Identity Module ("R-UIM") or SIM that may contain the MSID and the DN. If the R-UIM or SIM are not in the phone, then it can still be used to place an emergency call. However, there is no DN or MSID known to the phone or the serving system to provide the PSAP call center as a call back number.

Every MS contains a unique mobile equipment identification number ("MEIN") or mobile terminal identifier ("MTID") encoded in the phone by the manufacturer. The MTID may be, for example, an electronic serial number ("ESN"), as used in ANSI/TIA/EIA-41 systems or an International Mobile Equipment Identity ("IMEI") used in GSM systems. The MTID is independent of the MSID and DN. The MTID is signaled over the air between the wireless unit and the base station of a wireless system with a call origination attempt or soon thereafter. For example, if not supplied with the call origination attempt, the MTID may be requested by the serving system.

Current standards for wireless emergency services call for delivering "9-1-1+ the last seven digits of the MTID" to the PSAP call center as the form call back number when the directory number assigned to the wireless subscriber is not available. While this may serve to notify the PSAP call center that no working callback number is available with the call, the string of "9-1-1+the last seven digits of the MTID (MTID7)" do not uniquely identify the call (i.e., many emergency calls may be identified by the same "9-1-1+MTID7) and is not a routable number through the network. The "9-1-1+ the last seven digits of the MTID" do not contain a complete MTID, and therefore is not unique.

SUMMARY OF THE INVENTION

In one embodiment of the present invention, a unique call back number that is routable and uniquely identifies a wireless unit is generated.

Another embodiment of the present invention provides for updating the unique call back number based on a received unique call back number. For example, in one embodiment the unique call back number is changed to the received unique call back number, and in another embodiment, the unique call back number is updated by adding the received unique call back number to a list of call back numbers.

The updating may be by way of a serving system (i.e., a mobile switching center) sending an instruction to an emergency call register associated with the mobile switching center.

The updating may also be by way of an emergency call register (e.g., associated with a serving system or public safety answering point) updating an entry therein.

In a further embodiment, the method may include sending a call back instruction from a first emergency response register associated with a first public service answering point to a second emergency response register associated with a second public service answering point if a second network controller identified by a second received unique call back number is served by the second public service answering point associated and call back by the first public service answering point based on a first received unique call back number is unsuccessful. The call back instruction identifies the wireless unit, provides the second unique call back number and instructs the second public service answering point to perform call back to the identified wireless unit using the second unique call back number.

BRIEF DESCRIPTION OF THE DRAWINGS

The present invention will be better understood from reading the following description of non-limiting embodiments, with reference to the attached drawings, wherein below:

FIGS. 2-5 are communication flow diagrams illustrating the operation of the method of updating a unique call back number according to various embodiments of the present invention.

DETAILED DESCRIPTION OF EXAMPLE EMBODIMENTS

An example architecture for implementing the method of updating a unique call back number according to the present invention will first be described. Then, generation of a unique call back number will be described. This will be followed by a description of performing emergency call back using the unique call back number, and finally various examples of the method for updating a unique call back number will be described.

Architecture

Figure 1:
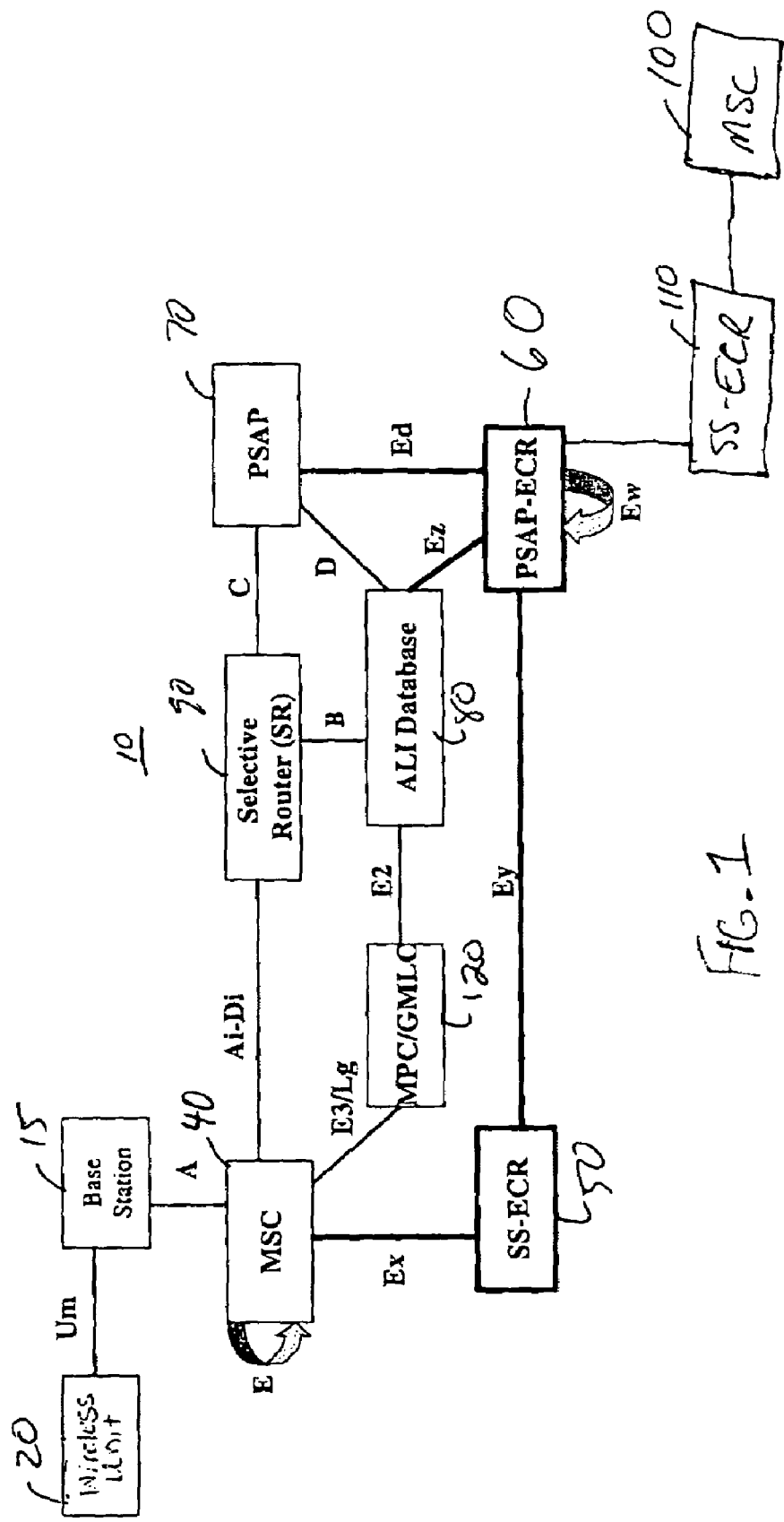
FIG. 1 illustrates an architecture of an embodiment of the present invention.

FIG. 1 illustrates an architecture of an embodiment of the present invention. FIG. 1 is reflective of an architecture 10 of a network reference model ("NRM") supporting mobile emergency service. Architecture 10 supports the unique identification of a wireless unit 20 originating an emergency "9-1-1" call and for enabling the call back of the wireless unit 20 originating the emergency "9-1-1" call using a unique identifier.

As shown in FIG. 1, a wireless unit 20 is shown for communicating an emergency call such as a "9-1-1" call to architecture 10. For the purposes of the present disclosure, an emergency "9-1-1" call corresponds with a call and/or a request for emergency services (e.g., police, fire department, road repair, and/or ambulance). The wireless unit 20 may be a wireless phone, wireless equipped PDA, wireless equipped computer/laptop, etc.

The communication, as originated by wireless unit 20, is conveyed to a mobile switching center 40 ("MSC") through a base station 15. Once the emergency "9-1-1" call is received by MSC 40, identification information associated with wireless unit 20 and which may have been sent by the wireless unit 20 in originating the emergency call, may be communicated to a serving system emergency call register 50 ("SS-ECR") associated with MSC 40. More particularly, the information associated with wireless unit 20 includes, for example, a mobile terminal identifier ("MTID"). The transfer of the MTID to SS-ECR 50 is performed by MSC 40 over a first NRM interface, $E_x$.

The MTID, as transferred to SS-ECR 50, might be realized by an International Mobile Equipment Identity ("IMEI"), electronic serial number ("ESN"), pseudo ESN ("pESN") and/or other mobile equipment identity ("MEID").

Besides the MTID, the identification information may also include a paging identity ("PGID") of the wireless unit 20. The PGID may be one of a number of communication standards-based identifiers (e.g., MSID) supporting paging wireless unit 20 to deliver an inbound call if the emergency "9-1-1" call is dropped or disconnected. With respect to a GSM-based system, wireless unit 20 may be paged via an international mobile station identity ("IMSI") provided by wireless unit 20, a temporary mobile station identity ("TMSI") associated with the IMSI and/or an IMEI from wireless unit 20. In a CDMA2000 system, this paging step may be realized using a mobile identification number ("MIN"), an IMSI, a default mobile station identity ("dMSID") from a non-subscriber initiated ("NSI") wireless unit (s), an ESN from wireless unit 20 and/or a pESN generated from an MEID within wireless unit 20.

In the event that the emergency "9-1-1" call from wireless unit 20 is dropped or disconnected from the base station and MSC 40, the PGID may be used to page wireless unit 20. To page wireless unit 20 in the circumstance of a call drop or disconnect, a Local Public Safety Number ("LPN") of MSC 40 may be needed to uniquely identify the switch serving the "9-1-1" caller (e.g., wireless unit 20). The Local Public Safety Number (LPN) is a dialable number NPA-NXX-XX, where the NPA-NXX uniquely identifies the MSC in the originating network. In order to avoid number portability and pooling complexities, the LPN may be taken from the native number block of the MSC. The LPN may assist in identifying SS-ECR 50 and for originating a call back to the wireless unit 20 originating the emergency "9-1-1" call in the event of a call drop or disconnect occurs as will be described below. Namely, as will be discussed in detail in the next section, the LPN may be used by the MSC 40 to generate a unique identifier or unique call back number for the wireless unit 20.

Emergency Service Routing Digits ("ESRD") to identify the originating cell site or sector or Emergency Service Routing Key ("ESRK"), which indicates that the location of the wireless unit is available from the MPC, may be employed for routing the emergency "9-1-1" call. As shown in FIG. 1 a mobile positioning center ("MPC") or geographical mobile location center ("GMLC") performs a geolocation operation on the wireless unit 20. The location information is communicated with an ESRK supplied by the MPC/GMLC 120 over an E3/Lg interface to the MSC 40 and over an E2 interface to an automatic line identifier ("ALI") database 80. The ALI database 80 stores location and other emergency call information for the public safety answering points (PSAPs) serving each geographic area. The MSC 40 routes the emergency call to a selective router 90 over an Ai-Di interface and supplies the ESRK and callback number (CBN) for the call. The selective router 90 signals the ALI database 80 over a B interface using the ESRK and CBN which signals the PSAP over the D interface that the call is to be routed. The selective router 90 simultaneously delivers the emergency call to the PSAP 70 over interface C.

The network elements and interfaces involved in providing an ESRK may be realized, in one embodiment, using existing communication standards. It should be noted that the Emergency Service Routing Digits may include, in one example, a string of numbers associated with a cell sector of the mobile switching center in which the emergency call originates, while the Emergency Service Routing Key may include a string of numbers associated with a wireless unit at a particular location at the time the 9-1-1 call originated.

The SS-ECR 50 may then send the received identification information over a network interface, $E_y$, to another emergency call register ("ECR") 60 associated with a public service answering point "PSAP") 70. Consequently, the MTID, LPN, MSID or dMSID, ESRK and/or a unique identifier (e.g., unique call back number or "UCBN") and mobile location information may be re-transmitted from SS-ECR 50 to PSAP-ECR 60. It should be noted that each ECR such as PSAP-ECR 60 may be realized by a database. This and the other associated databases may be keyed on the ESRK, the MTID, the mobile station identity (e.g., a PGID such as MIN or IMSI) and/or the directory number of the caller.

The E interfaces depicted support signaling of emergency data and service requests through architecture 10 between MSC 40 and PSAP 70. Call handling instructions from PSAP 70, such as to establish a callback through MSC 40, may be communicated from PSAP 70 to ECR 60 over an $E_d$ interface, on to SS-ECR 50 through an $E_y$ interface and from SS-ECR 50 to MSC 40 through an $E_x$ interface. Here, PSAP 70 may communicate with ECR 60 directly over the $E_d$ interface using a unique identifier (e.g., a unique call back number) or MTID as a key. Alternatively, PSAP 70 may communicate with ECR 60 indirectly through the ALI database 80 over the D and $E_z$ interfaces using ESRK or the unique identifier (e.g., a unique call back number) as a key.

The SS-ECR 50 and PSAP-ECR 60 may be implemented as a single entity. As shown, however, SS-ECR 50 and PSAP-ECR 60 are individual elements to allow consideration for one SS-ECR to serve one MSC and one SS-ECR to interface with many ECRs associated with PSAP 70. Associated with this, FIG. 1 also shows a second MSC 100 and a second SS-ECR 110. For the purposes of simplifying FIG. 1 only, the interfaces and other elements connecting the second MSC 100 with the PSAP 70 have not been shown, but it will be understood that they are present in the same manner as described above with respect to the first MSC 40. In addition, while one ECR may serve many PSAPs, one PSAP need only interface with one ECR. Moreover, PSAP 70 may have access to information in many ECRs through ECR networking over the $E_w$ interface.

Unique Call Back Number

Next, an embodiment of uniquely identifying one or more wireless units originating an emergency (e.g., a "9-1-1") call will be described. More particularly, an identifier that enables the call back of a wireless unit originating a "9-1-1" call will be described. For the purposes of explanation only, this unique identifier or unique call back number will be described with reference to FIG. 1 for the situation where the wireless unit 20 originates an emergency call with the MSC 40. When a wireless unit such as wireless unit 20 originates an emergency call, the serving MSC such as MSC 40 associates a routing tag with the wireless unit 20 originating the "9-1-1" call. For the purposes of the present disclosure, the routing tag may comprise, for example, a string of numbers corresponding with Emergency Service Routing Digits ("ESRD") and/or an Emergency Service Routing Key ("ESRK"). Consequently, while the routing tag may identify the originating system and destination PSAP, the routing tag may not uniquely identify the emergency "9-1-1" call if it is an ESRD or may be unable to uniquely identify the emergency "9-1-1" call once the originating call is no longer in progress. As discussed previously, the MSC 40 also receives the MTID as well as the PGID for the wireless unit 20.

In this embodiment, once the routing tag is received, the MSC 40 generates the unique identifier. Unlike the routing tag, the unique identifier identifies the emergency "9-1-1" call even if the originating call is no longer in progress. In one embodiment, the unique identifier may be a ten (10) digit, unique call back number ("UCBN") associated with the serving MSC 40. In one embodiment, the unique call back number comprises a string of numbers corresponding with a local public safety number ("LPN") associated with the serving MSC 40. For example, the unique call back number may comprise six (6) fixed digits associated with the LPN (e.g., NPA+NXX) and four unassigned digits (X). In this scenario, the four unassigned digits may translate into 10,000 unique number sequences to be assigned as a result of this generating step. As will be appreciated, because the unique call back number includes the LPN of the serving MSC, the unique call back number includes information identifying the serving MSC. Stated another way, the unique call back number includes routing information so that a call back using the unique call back number will be routed to the serving MSC. The last four digits of the unique call back number, also referred to as a unique LPN or uLPN, uniquely distinguishes the emergency call of the wireless unit from other emergency calls of other wireless units at the serving MSC.

Emergency Call Back

The MSC 40 may store the generated unique identifier uLPN in the SS-ECR 50 along with the MTID and PGID of the wireless unit 20. The SS-ECR 50 may communicate the MTID and uLPN information to the PSAP-ECR 60. Namely, the UCBN is dynamically assigned at the serving system (e.g., MSC) when a 9-1-1 call is originated. It is stored in the SS-ECR such as SS-ECR 50 and the PSAP-ECR 60 as a key to those databases. If an emergency call drops, the PSAP 70 retrieves the call back information from the PSAP-ECR 60 and originates a call back. As stated above, the UCBN is a unique 10-digit dialable number based on the NPA-NXX from the LPN of the serving system. The last four digits are uniquely assigned to each call at the serving system. The UCBN is not a Mobile Directory Number (MDN) or Mobile Station ISDN Number (MSISDN) assigned to the calling subscriber by the home service provider. If the UCBN is used for call back by the PSAP 70, it is signaled to the serving system MSC, MSC 40 in this example, as the Called Party Number (CdPN). The MSC 40 uses the UCBN to request a PGID from the SS-ECR 50. The PGID is then used by the MSC 40 to page the phone and complete the callback.

Based on existing guidelines, the UCBN may be signaled from the MSC 40 to the selective router 90 and on to the PSAP 70 as the Call Back Number (CBN) in the Calling Party Number (CgPN) or the Charge Number (CHGN) when the ESRD is populated in either the Generic Digits Parameter (GDP) or the Called Party Number (CdPN). When the ESRK is populated as either the CPN or CHGN, the UCBN may be populated in the other field or in the GDP.

If the UCBN is not signaled with a call routed by the ESRK, then the PSAP 70 may use the ESRK while the call is still in progress to obtain the UCBN from the PSAP-ECR 60 directly or via the ALI database 80. The ALI database 80 may get the UCBN from the PSAP-ECR 60 or the MPC/GMLC 120. The MPC/GMLC 120 may have the UCBN if it is provided by the MSC 40.

An Emergency Call Register (ECR) is a database holding emergency call detail information and call handling instructions for the MSC. The serving system ECR database, in this embodiment, is keyed on the UCBN, ESRK or MTID and also contains the MTID, PGID, ESRK or ESRD, UCBN and originating location for the emergency 9-1-1 call, as well as the LPN of the associated serving system. The LPN may be updated automatically as the wireless unit originating the emergency 9-1-1 call roams and is handed off (or over) from one serving system to another.

ECR entries may be created in different ways. An entry may be created at the originating network with the origination of a 911 call, through a download of entries from other ECRs or by manual entry. Manual entry of a MTID and any local LPN into the ECR associated with the PSAP allows the PSAP to call any wireless unit through the MSC even if the wireless unit was not used to originate an emergency 9-1-1 call. LPN Update procedures allow for the LPN of the serving system to be automatically entered into the SS-ECR after the wireless unit is located in the true serving system. The LPN is updated in other PSAP-ECRs and SS-ECRs through the Mobile E-9-1-1 Network.

The Mobile E9-1-1 Network may be used to exchange data between ECRs and trigger events in other network elements. An ECR is located with an MSC at the serving system (SS-ECR), a PSAP in the Emergency Services Network (PSAP-ECR), and any other call center handling emergency calls. For example, a secondary PSAP or a Telematics Call Center may have an ECR to track 9-1-1 calls and other outbound calls placed for their clients, to track inbound calls from clients or to remotely request service for clients through the serving system.

The ECR Network is used for more than exchanging emergency call information and tracking individual phones. The ECR network is also used to manage mobility for mobile phones used to place an emergency 9-1-1 call and request services through the MSC. Messages are signaled through the network to support intersystem operations for Intersystem Roaming and Emergency Short Message Service for NSI Phones and International Roamers, Emergency Call Origination through the MSC for Telematics Call Centers, PSAP-to-PSAP Call Forwarding or Conference Calling through the MSC, LPN Update, Intersystem Paging for Emergency Call Back and possibly many other services. The PSAP-ECR acts like a Home Location Register (HLR) and the SS-ECR acts like a Visitor Location Register (VLR).

Updating Unique Call Back Number

Next, embodiments of the method for updating the unique call back number will be described. For the purposes of example only, these method embodiments will be described with reference to the architecture of FIG. 1. However, it will be understood that the methodologies of the present invention are not limited to this architecture. As wireless unit 20 roams from one serving system to another, call back using an existing unique call back number assigned by the old serving system may not be possible. Instead, the new serving system assigns a new unique call back number. However, the emergency call may drop before the PSAP 70 or PSAP-ECR 60 obtains the new unique call back number assigned by the new serving system. The method according to the present invention provides ways of updating the call back number so that emergency call back may be performed even when the wireless unit roams.

Figure 2:
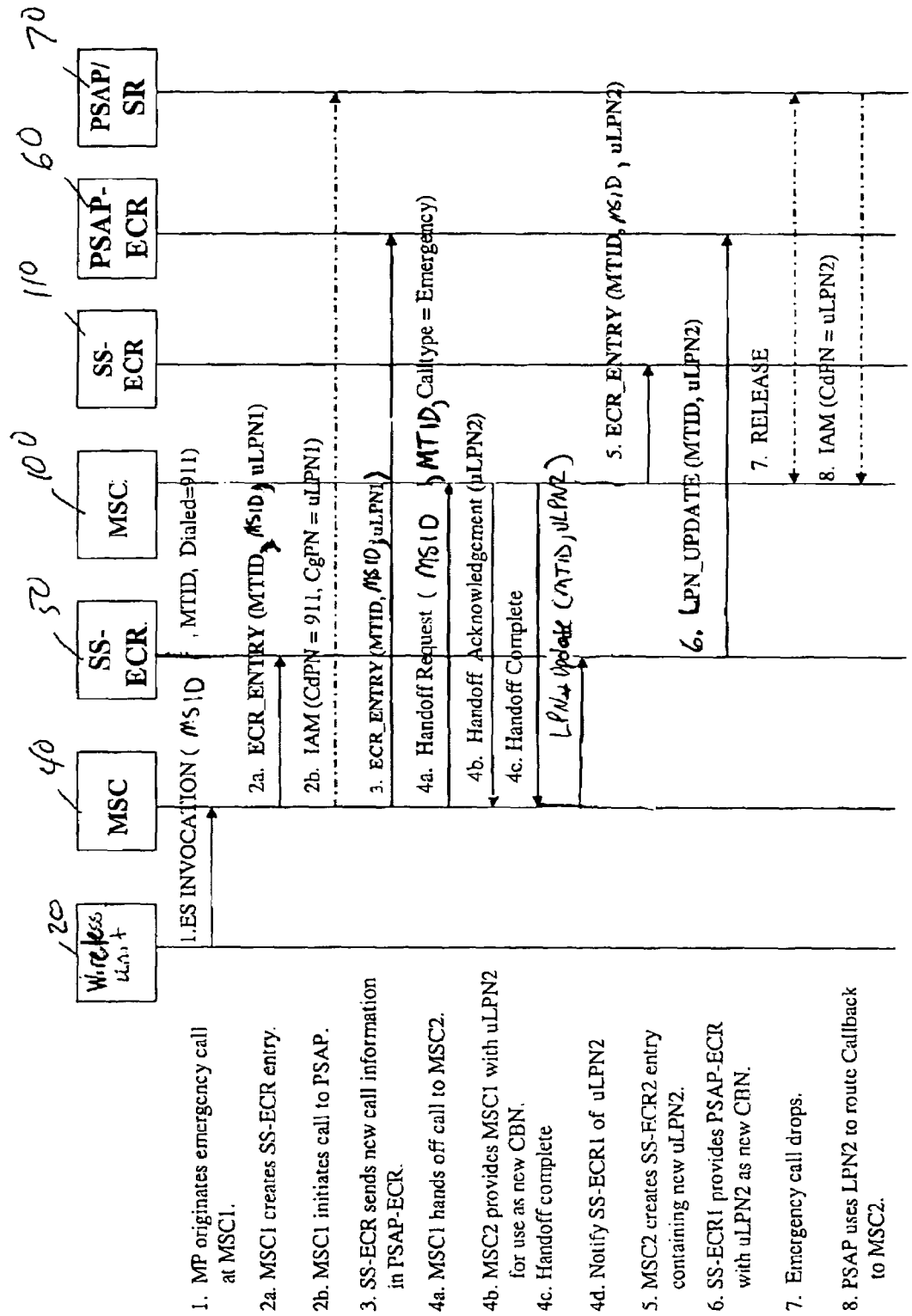

FIG. 2 illustrates a call flow diagram of a first embodiment for updating a unique call back number according to the present invention. As shown, in call flow step 1, the wireless unit 20 originates an emergency call to the MSC 40. The origination includes the called or dialed number of "9-1-1", and the MTID and the MSID of the wireless unit 20. The MSC

40 then creates the unique call back number (UCBN) for the emergency call of the wireless unit 20. As shown in FIG. 1, in this example embodiment, a uLPN1 is generated as the UCBN. The MSC 40 then sends in step 2a an ECR-Entry message to the SS-ECR 50 to create an entry in the SS-ECR 50 for this emergency call. The ECR-Entry message, and therefore the entry in the SS-ECR 50, includes the MTID, ESRK or ESRD (not shown), a PGID (e.g., the MSID as shown) and the uLPN.

In step 2b, the MSC 40 routes the emergency call to the PSAP 70 using the ESRK and/or ESRD received. The routed emergency call indicates the called party number (CdPN) as "9-1-1", and the calling party number (CgPN) as the uLPN1.

In step 3, the SS-ECR 50 sends an ECR_Entry message to the PSAP-ECR 60. This message includes the MTID, MSID, ESRK or ESRD (not shown) and uLPN1 for the wireless unit 20.

Next, FIG. 2 illustrates that the wireless unit 20 is being handed off from the serving system of MSC 40 to the serving system of MSC 100. Any well-known method of determining handoff may be employed. In step 4a, the MSC 40 sends the handoff request to the MSC 100. The MSC 100 responds in step 4b with a handoff acknowledgement that includes the unique call back number uLPN2 generated and assigned to the wireless unit 20 by the MSC 100, and the MSC 100 further indicates in step 4c that the handoff is complete. Except for generating and communicating the uLPN2 in the handoff acknowledgement, steps 4a-4c will be recognized as a conventional handoff communication flow.

In step 4d, the MSC 40 notifies the SS-ECR 50 associated therewith of the new unique call back number uLPN2 for the wireless unit 20 using a LPN_Update message. The LPN_Update message includes the new call back number uLPN2 and the MTID for the wireless unit 20. Using the MTID, the SS-ECR 50 access the entry for the wireless unit 20, and updates the unique call back number by changing the unique call back number from uLPN1 to uLPN2. The MSC 100 will also create an entry in its associated SS-ECR 110 in step 5. The ECR-Entry message sent by the MSC 100, and therefore the entry in the SS-ECR 10, includes the MTID, MSID and the uLPN2 for the wireless unit 20.

In step 6, the SS-ECR 50, in response to updating its entry for the wireless unit 20, sends a LPN_Update message to the PSAP-ECR 60. The LPN_Update message includes the new call back number uLPN2 and the MTID for the wireless unit 20. Using the MTID, the PSAP-ECR 60 accesses the entry for the wireless unit 20, and updates the unique call back number by changing the unique call back number from uLPN1 to uLPN2.

If the emergency call should drop, as shown in step 7, the PSAP 70 may perform call back to the wireless unit 20 by accessing uLPN2 for the wireless unit 20 from the PSAP-ECR 60 and initiating call back using the uLPN2 as the called party number. As will be appreciated from this description, even though the emergency call drops during handoff, a call back may be performed because the new unique call back number was updated at the PSAP-ECR 60 thanks to the unique call back number being sent to the old serving system and updated at the old SS-ECR. Furthermore, call back was effectively performed even though the new serving system was unable to communicate the new unique call back number to the PSAP before the call dropped.

Figure 3:
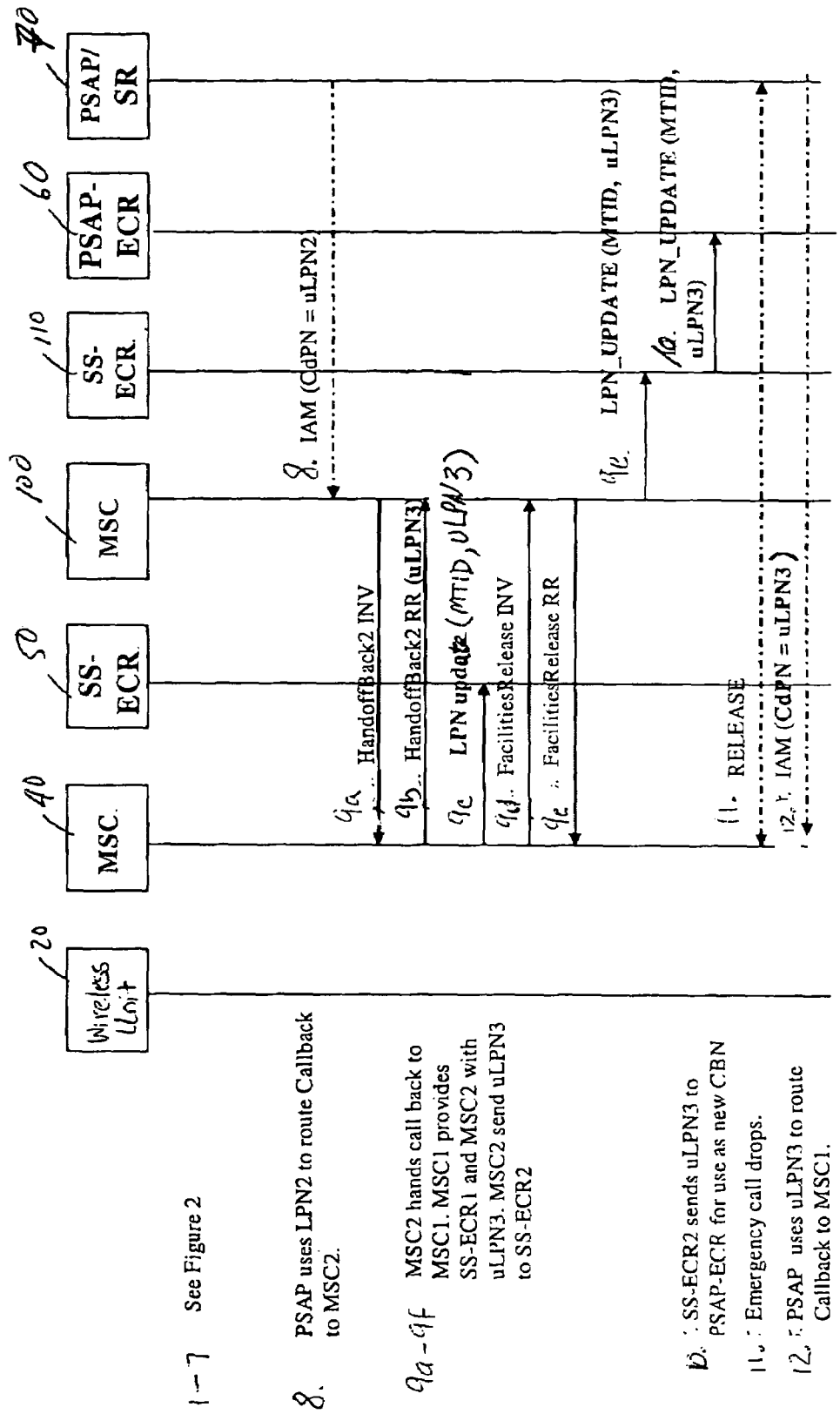

FIG. 3 illustrates a call flow diagram of a second embodiment for updating a unique call back number according to the present invention. As shown, steps 1-8 are the same as in FIG. 2 where an effective call back to the wireless unit 20 via the MSC 100 took place. FIG. 3 then illustrates hand-back of the wireless unit 20 to the MSC 40 from the MSC 100. As shown, in step 9a, the MSC 100 sends a hand-back invocation to the MSC 40. In step 9b, the MSC 40 response with a hand-back acknowledgement that includes the new unique call back number uLPN3 assigned to the wireless unit 20 for the emergency call. Step 9c shows the MSC 40 communicating the new unique call back number uLPN3 to the SS-ECR 50 for the MSC 40. Namely, the MSC 40 sends a LPN_Update message to the SS-ECR 50 that includes the MTID and the uLPN3. Using the MTID, the SS-ECR 50 accesses the entry for the wireless unit 20, and updates the unique call back number by changing the unique call back number from uLPN2 to uLPN3.

FIG. 3 then shows the MSC 40 in step 9d sending a facilities release invocation to the MSC 100 indicating that the MSC 100 may release its facilities for the emergency call of the wireless unit 20. In step 9e, the MSC 100 sends a facilities release response indicating that it has released its facilities for the emergency call of the wireless unit 20.

In accordance with the receipt of the new unique call back number uLPN3 for the wireless unit 20, in step 9e the MSC 100 updates the SS-ECR 110 associated therewith. Namely, the MSC 100 sends a LPN_Update message to the SS-ECR 110 that includes the MTID and the uLPN3. Using the MTID, the SS-ECR 10 accesses the entry for the wireless unit 20, and updates the unique call back number by changing the unique call back number from uLPN2 to uLPN3.

In step 10, the SS-ECR 10, in response to updating its entry for the wireless unit 20, sends a LPN_Update message to the PSAP-ECR 60. The LPN_Update message includes the new call back number uLPN3 and the MTID for the wireless unit 20. Using the MTID, the PSAP-ECR 60 accesses the entry for the wireless unit 20, and updates the unique call back number by changing the unique call back number from uLPN2 to uLPN3.

If the emergency call should drop, as shown in step 11, the PSAP 70 may perform call back to the wireless unit 20 by accessing uLPN3 for the wireless unit 20 from the PSAP-ECR 60 and initiating call back using the uLPN3 as the called party number. As will be appreciated from this description, even though the emergency call drops during hand-back, a call back may be performed because the new unique call back number was updated at the PSAP-ECR thanks to the unique call back number being sent to the old serving system and updated as the old SS-ECR. Furthermore, call back was effectively performed even though the new serving system was unable to communicate the new unique call back number to the PSAP before the call dropped.

FIG. 4 illustrates a call flow diagram of a third embodiment for updating a unique call back number according to the present invention. As shown, in call flow step 1, the wireless unit 20 originates an emergency call to the MSC 40. The origination includes the called or dialed number of "9-1-1", and the MTID and the MSID for the wireless unit 20. The MSC 40 then creates the unique call back number (UCBN) for the emergency call of the wireless unit 20. As shown in FIG. 4, in this example embodiment, a uLPN1 is generated as the UCBN. In step 2a, the MSC 40 routes the emergency call to the PSAP 70 using the ESRK and/or ESRD received. The routed emergency call indicates the called party number (CdPN) as "9-1-1" and the calling party number (CgPN) as uLPN1. The MSC 40 then sends in step 2b an ECR-Entry message to the SS-ECR 50 to create an entry in the SS-ECR 50 for this emergency call. The ECR-Entry message, and therefore the entry in the SS-ECR 50, includes the MTID, MSID and the uLPN1 for the wireless unit 20.

In this embodiment, it is assumed that the wireless unit 20 roams from the serving system of MSC 40 to the serving system of MSC 100, and that while MSC 40 was informed of the potential new serving system, and therefore, obtained the LPN (e.g., LPN2) of the MSC 100, the call dropped in step 3 before handoff could take place.

In view of the release, in step 4, the MSC 40 sends the SS-ECR 50 a LPN_Update message. This message indicates that the wireless unit 20 has a new serving system. The wireless unit 20 is identified in the message by its MTID, and the new serving system is identified by the LPN, LPN2, of the new serving system. In response, the SS-ECR 50 sends a LPN_Request to the SS-ECR 10 associated with the MSC 100 identified by the LPN2. Namely, the SS-ECR 50 identifies the SS-ECR 10 for the MSC 100 using the LPN2 for the MSC 100. The LPN_Request includes the MSID and MTID of the wireless unit 20. The MSID and/or MTID identify the wireless unit 20 for the SS-ECR 10. In response to the LPN_Request, the SS-ECR 110 requests and obtains a uLPN, uLPN2, for the identified wireless unit 20 from the MSC 100. The SS-ECR 10 then creates an entry for the wireless unit 20 using the MTID, MSID if available and the uLPN2. The SS-ECR 10 sends a response message "lpn_request" to the SS-ECR 50 in step 6. This message indicates the MTID of the wireless unit 20 and the newly assigned uLPN2.

In step 7, the SS-ECR 50 sends an LPN_Alternate message to the PSAP-ECR 60. This message instructs the PSAP-ECR 60 to update the entry for the wireless unit identified in the message by adding the call back number included in the message to the entry. Namely, updating of the entry in response to the LPN_Alternate message does not result in a change in the call back number, but instead, the addition of a further, possible call back number. Accordingly, in step 7, the LPN_Alternate message includes the MTID of the wireless unit 20 and the uLPN2.

In step 8, in response to the emergency call dropping, the PSAP 70 may perform call back to the wireless unit 20 by accessing uLPN1 for the wireless unit 20 from the PSAP-ECR 60 and initiating call back using the uLPN1 as the called party number. As this call back may be unsuccessful, the PSAP 70 in step 9, may access uLPN2 for the wireless unit 20 from the PSAP-ECR 60 and initiate call back using uLPN2 as the called party number. As will be appreciated from this description, even though the emergency call drops while the wireless unit is roaming and may be in either one of two serving systems, a call back may be attempted through both serving systems to increase the likelihood of a successful callback.

FIG. 5 illustrates a call flow diagram of a fourth embodiment for updating a unique call back number according to the present invention. As shown, steps 1-8 are the same as in FIG. 4. However, in this embodiment, the MSC 100 is not associated with the same PSAP 70 and PSAP-ECR 60 as the MSC 40. Consequently, if the call back based on the uLPN1 is not successful, the PSAP/PSAP-ECR 70/60 sends a Callback message to the PSAP/PSAP-ECR 140 associated with the MSC 100. As will be recalled, the uLPN2 includes the LPN2 of the MSC 100. Accordingly, from this the PSAP-ECR 60, which includes a table of PSAP and MSC associations, can determine the PSAP/PSAP-ECR 140 associated with the MSC 100, and properly route the Callback message to the PSAP/PSAP-ECR 140 for the MSC 100. The Callback message instructs the PSAP-ECR for the MSC 100 to create an entry, and instructs the PSAP for the MSC 100 to initiate a call back to the wireless unit 20. Accordingly, the Callback message includes the MTID, MSID and uLPN2 for the wireless unit 20. In step 10, in response to the Callback message, the PSAP for the MSC 100 initiates a call back to the wireless unit 20 using uLPN2 as the called party number.

As will be appreciated from this description, even though the emergency call drops while the wireless unit is roaming and may be in either one of two serving systems, each served by a different PSAP, a call back may be attempted through both serving systems.

For each of the call flow diagrams illustrated in FIGS. 2-5, it will be understood that some of the call flow steps do not necessarily occur in the order illustrated. For example, in FIG. 2, step 5 may occur concurrently with or before step 4*d*.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, the method, system and portions thereof may be implemented in different locations. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention.

I claim:

1. A method of updating a unique call back number for a wireless unit having originated an emergency call, comprising:

receiving a second unique call back number and a mobile equipment identity at a first network controller from a second network controller, the first network controller handing off the wireless unit to the second network controller;

transmitting the second unique call back number and the mobile equipment identity from the first network controller to a first emergency response register associated with the first network controller via a first interface;

transmitting the second unique call back number and the mobile equipment identify from the first emergency response register to a second emergency response register associated with a public service answering point via a second interface different from the first interface;

assessing a first and second entry for the wireless unit based on the mobile equipment identity, the first entry being stored at the first emergency response register associated with the first network controller, the second entry being stored at the second emergency response register associated with the public service answering point, the first and second entry including a first unique call back number being keyed on the mobile equipment identity; and updating the first unique call back number for the wireless unit by writing over the first unique call back with the second unique call back number at the first and second entries;

the second unique call back number includes a first set of digits identifying the second network controller, and a second set of digits identifying the emergency call originated by the wireless unit, the second set of digits distinguishing the emergency call originated by the wireless unit from other emergency calls, and the first set of digits corresponds to a local public safety number.

2. The method of claim 1, wherein the received second unique call back number includes routing information for routing a call to the network controller.

3. The method of claim 1, wherein the received second unique call back number includes information identifying a different network controller than an existing unique call back number for the wireless unit.

4. A method of updating a unique call back number for a wireless unit having originated an emergency call, comprising:
   receiving a second unique call back number and mobile equipment identity at a second network controller handing off the wireless unit from a first network controller, the second network controller handling back the wireless unit to the first network controller;
   receiving the second unique call back number and the mobile equipment identity at a first emergency response register associated with the first network controller via a first interface;
   transmitting the second unique call back number and the mobile equipment identify from the first emergency response register to a second emergency response register associated with a public service answering point via a second interface different from the first interface;
   assessing a first and second entry for the wireless unit based on the mobile equipment identity, the first entry being stored at the first emergency response register associated with the first network controller, the second entry being stored at the second emergency response register associated with the public service answering point, the first and second entry including a first unique call back number being keyed on the mobile equipment identity; and
   updating the first unique call back number for the wireless unit by writing over the first unique call back number with the second unique call back number at the first and second entries;
   the second unique call back number includes a first set of digits identifying a network controller that generated the received unique call back number, and a second set of digits identifying the emergency call originated by the wireless unit, the second set of digits distinguishing the emergency call originated by the wireless unit from other emergency calls, and the first set of digits corresponds to a local public safety number.

5. The method of claim 4, wherein the received second unique call back number identifies a network controller that generated the received unique call back number.

6. The method of claim 4, wherein the received second unique call back number includes information identifying a different network controller than an existing unique call back number for the wireless unit.

7. A method of updating a unique call back number for a wireless unit having originated an emergency call, comprising:
   receiving a first unique call back number for the wireless unit, the first unique call back number including information identifying a first network controller;
   receiving a second unique call back number and a mobile equipment identity for the wireless unit at a first network controller subsequent to receiving the first unique call back number, the second unique call back number including a first set of digits identifying a second network controller, and a second set of digits identifying the emergency call originated by the wireless unit, the second set of digits distinguishing the emergency call originated by the wireless unit from other emergency, and the first set of digits corresponds to a local public safety number;
   transmitting the second unique call back number and the mobile equipment identity from the first network controller to a first emergency response register associated with the first network controller via a first interface;
   transmitting the second unique call back number and the mobile equipment identify from the first emergency response register to a second emergency response register associated with a public service answering point via a second interface different from the first interface;
   assessing a first and second entry for the wireless unit based on the mobile equipment identity, the first entry being stored at the first emergency response register associated with the first network controller, the second entry being stored at the second emergency response register associated with the public service answering point, the first and second entry including the first unique call back number being keyed on the mobile equipment identity; and
   writing over the first unique call back number with the second unique call back number associated with the wireless unit at the first and second entries.

8. A method of updating a unique call back number for a wireless unit having originated an emergency call, comprising:
   receiving a first unique call back number for the wireless unit, the first unique call back number including information identifying the first network controller; and
   receiving a second unique call back number and a mobile equipment identity for the wireless unit at a first network controller, the second unique call back number including a first set of digits identifying a second network controller and a second set of digits identifying the emergency call originated by the wireless unit, the second set of digits distinguishing the emergency call originated by the wireless unit from other emergency calls, and the first set of digits corresponds to a local public safety number;
   transmitting the second unique call back number and the mobile equipment identity from the first network controller to a first emergency response register associated with the first network controller via a first interface;
   transmitting the second unique call back number and the mobile equipment identify from the first emergency response register to a second emergency response register associated with a public service answering point via a second interface different from the first interface;
   assessing a first and second entry for the wireless unit based on the mobile equipment identity, the first entry being stored at the first emergency response register associated with the first network controller, the second entry being stored at the second emergency response register associated with the public service answering point, the first and second entry including the first unique call back number being keyed on the mobile equipment identity; and
   adding the second unique call back number to a list of possible call back numbers for the wireless unit that includes the first unique call back number at the first and second entries.

9. The method of claim 8, further comprising:
   sending a call back instruction from the first emergency response register to a second emergency response register if the second network controller identified by the second unique call back number is served by a second public service answering point associated with the second emergency response register and call back by the first public service answering point based on the first unique call back number is unsuccessful, the call back instruction identifying the wireless unit, providing the second unique call back number and instructing the second public service answering point to perform call back to the identified wireless unit using the second unique call back number.

10. A method of updating a unique call back number for a wireless unit having originated an emergency call, comprising:

receiving a first unique call back number for the wireless unit, the first unique call back number including information identifying the first network controller; and receiving a second unique call back number and a mobile equipment identity for the wireless unit at a first network controller, the second unique call back number including a first set of digits identifying a second network controller, and a second set of digits identifying the emergency call originated by the wireless unit, the second set of digits distinguishing the emergency call originated by the wireless unit from other emergency calls, and the first set of digits corresponds to a local public safety number, wherein the receiving the second unique call back number can be performed even if the wireless unit is not registered with a service provider;

transmitting the second unique call back number and the mobile equipment identity from the first network controller to a first emergency response register associated with the first network controller via a first interface;

transmitting the second unique call back number and the mobile equipment identify from the first emergency response register to a second emergency response register associated with a public service answering point via a second interface different from the first interface;

assessing a first and second entry for the wireless unit based on the mobile equipment identity, the first entry being stored at the first emergency response register associated with the first network controller, the second entry being stored at the second emergency response register associated with the public service answering point, the first and second entry including the first unique call back number being keyed on the mobile equipment identity; and adding the second unique call back number to a list of possible call back numbers for the wireless unit that includes the first unique call back number at the first and second entries.

11. The method of claim 10, further comprising:

first performing call back using the first unique call back number if an emergency call for the wireless unit drops; and second performing call back using the second unique call back number if the first performing step is unsuccessful.

12. A method of updating a unique call back number for a wireless unit having originated an emergency call, comprising:

generating a unique call back number in response to receiving an emergency call;

generating an emergency call entry including the unique call back number and a mobile equipment identity, the unique call back number including a first set of digits identifying a network controller to which the wireless unit is being handed off, and a second set of digits identifying the emergency call originated by the wireless unit, the second set of digits distinguishing the emergency call originated by the wireless unit from other emergency calls, and the first set of digits corresponds to a local public safety number;

transmitting the unique call back number and the mobile equipment identity from the network controller to a first emergency response register associated with the network controller via a first interface;

transmitting the unique call back number and the mobile equipment identify from the first emergency response register to a second emergency response register associated with a public service answering point via a second interface different from the first interface;

storing the unique call back number in association with the mobile equipment identity at the first emergency response register associated with the network controller and the second emergency response register associated with the public service answering point, the unique call back number being keyed on the mobile equipment identity;

updating the stored unique call back number for the wireless unit based on a subsequently received unique call back number at the first emergency response register and the second emergency response register.

* * * * *